United States Patent [19]
Yamine

[11] 4,262,210
[45] Apr. 14, 1981

[54] DEVAPORIZER-WINDMILL SYSTEM AND APPARATUS

[76] Inventor: Anthony S. Yamine, 4679 Pardee Rd., Dearborn Heights, Mich. 48125

[21] Appl. No.: 871,179

[22] Filed: Jan. 23, 1978

Related U.S. Application Data

[60] Division of Ser. No. 636,538, Dec. 1, 1975, Pat. No. 4,071,336, which is a continuation of Ser. No. 433,187, Jan. 21, 1974, abandoned.

[51] Int. Cl.$^3$ ............................................. F01D 15/10
[52] U.S. Cl. ....................................... 290/54; 290/52; 290/55
[58] Field of Search ................................... 290/42–44, 290/52–55

[56] References Cited
U.S. PATENT DOCUMENTS
4,071,336  1/1978  Yamine ................................. 55/203

Primary Examiner—J. V. Truhe
Assistant Examiner—John W. Redman

[57] ABSTRACT

A devaporizer-windmill system wherein a rotary fan-like separator and motor-generator functions as a vertical, wind-powered, electric generator which also dehumidified the through going air and collects the resulting moisture which merges with a stream of collected rain water for the purpose of powering a hydro-electric generator. The fan blades of the separator apparatus carry an absorbing desiccant material which absorbs the moisture from the air and simultaneously expels the dehumidified air. Centrifugal force acts on the absorbed moisture to radially translate it in an outward fashion into a circular collector from where the moisture is conveyed to a reservoir disposed higher than the hydro-electric generator. The desiccant material is thereby continuously purged and capable of continuously dehumidifying the incoming air.

7 Claims, 3 Drawing Figures

DEVAPORIZER-WINDMILL SYSTEM AND APPARATUS

The present application is a division of application Ser. No. 636,538, filed on Dec. 1, 1975, now U.S. Pat. No. 4,071,336, which in turn is a continuation of application Ser. No. 433,187, filed on Jan. 21, 1974, now abandoned.

The entire disclosures of the aforementioned applications Ser. No. 433,187 and 636,538 are incorporated herein by reference thereto.

The present invention relates generally to a system and apparatus which includes a hydrodynamic electric generator, and means for separating liquid from gases utilizing a predetermined desiccant material.

In particular, the present invention relates to a devaporizer-windmill system and apparatus wherein a rotary fan-like separator and motor-generator functions as a vertical, wind-powered, electric generator which also dehumidifies the through going air and collects the resulting moisture which merges with a stream of collected rain water for the purpose of powering a hydrodynamic electric generator.

BACKGROUND OF THE INVENTION

It is well-known that water vapor can be removed from air by a variety of methods including compressions, refrigeration, heat, and absorbing materials. The present invention particularly utilizes gas and vapor separators which employ absorbing materials. In conventional processes the absorbing material must be reactivated, i.e., purged of the absorbed matter, on either a periodic or continuous basis. A typical method of purging the absorbing material is thermal reactivation. These prior art methods of reactivation are very inefficient, and therefore waste great quantities of energy. The present invention overcomes the above mentioned deficiencies of the prior art by providing a novel system and apparatus which is simple in design, can be inexpensively manufactured, and efficiently operated.

The prior art is exemplified by U.S. Pat. Nos.: Ward et al 1,363,699; Thompson 1,447,160; Nuss 1,481,221; Egli 1,814,028; Earnshaw 1,876,212; Miller et al 1,912,784; Mazza 2,081,406; Shoeld 2,302,807; Lunde 2,889,007; Pilo et al 2,941,872; Mosier 3,078,647; Schwab 3,126,263; Teller 3,183,649; Dills 3,381,453; Weil et al 3,470,708; Beck 3,492,980; Courbon 3,590,629; Colvin et al 3,619,987; Asker et al 3,664,095; Beveridge et al 3,683,597; Wenner 3,780,498; Aine 3,903,694; Bergmann 2,197,120; and Sadd British Pat. No. 532,467.

SUMMARY OF THE INVENTION

The present invention provides a system comprising a hydrodynamic electric generator, and a reservoir for liquid operably communicating with the hydrodynamic electric generator for supplying liquid to the generator for causing the generator to thereby produce electric power. The system also includes a motor-generator electrically connected to the hydrodynamic electric generator and first means for separating liquid from gases. The first means is operably and rotatably connected to the motor-generator. The system also includes second means for admitting gases to enter therein and for directing the admitted gases in a first predetermined direction toward and through the first means. The second means operably communicates with the first means so that normally the admitted gases directed in the first predetermined direction cause the first means to rotate at a suitable speed. The hydrodynamic electric generator selectively feeds at least a portion of the produced electric power to the motor generator to at least assist the directed admitted gases to rotate the first means when the directed admitted gases are incapable of rotating the first means at a suitable speed without assistance. The system also includes third means for conducting the liquid separated from the gases to the reservoir, and fourth means for directing the deliquified gases out to the ambient atmosphere. The system further includes fifth means for collecting liquid from the ambient atmosphere, and sixth means for conducting the liquid collected from the ambient atmosphere to the reservoir.

The present invention also provides apparatus for implementing the system described immediately hereinabove. In a preferred embodiment, the present invention provides a system and an apparatus wherein the aforementioned first means includes a predetermined desiccant material which absorbs the liquid from the directed gases, and wherein the absorbed liquid is discharged radially from the first means and the deliquified gases are expelled axially from the first means.

It is an object of the present invention to provide a system and apparatus of the aforedescribed type wherein the first means for separating liquid from gases includes an axial fan with blade members which carry an absorbing material. There are several well-known desiccants, or absorbing agents such as silica gel, alumina gel, anhydrous calcium sulphate, and the like which can be employed with the present invention. The choice of a particular desiccant will depend upon the nature, quantity, and quality of both the adulterated gas and the vapors and gases to be removed therefrom. When needed, a power means, such as an electric motor-generator may assist to rotate the fan causing the gas, such as air, to flow through the apparatus. As the fan blades contact the fluid, the desiccant material absorbs the predetermined vapors and gases to be removed and simultaneously expels the cleansed fluid. The rotation of the fan creates a centrifugal force which acts on the absorbed matter. Said force causes the matter to translate outwardly, in a radial direction, into a collector. The desiccant material is thereby purged and capable of continuously cleansing the adulterated fluid.

Other objects and advantages of the present invention will appear from the following description and appended claims, reference being had to the accompanying drawings forming a part of this specification wherein like reference characters are intended to designate corresponding parts in the several views.

DETAILED DESCRIPTION OF SOME PREFERRED EMBODIMENTS OF THE PRESENT INVENTION

Before explaining the present invention in detail, it is to be understood that the present invention is not limited in its application or use to the details of construction and arrangement of parts illustrated in the accompanying drawing, because the present invention is capable of other embodiments, variations and modifications, and of being practiced or carried out in various ways. Furthermore, it is to be understood that the phraseology or terminology employed herein is for the purpose of description and illustration only, and not for the purpose of limitation.

Figure 1:
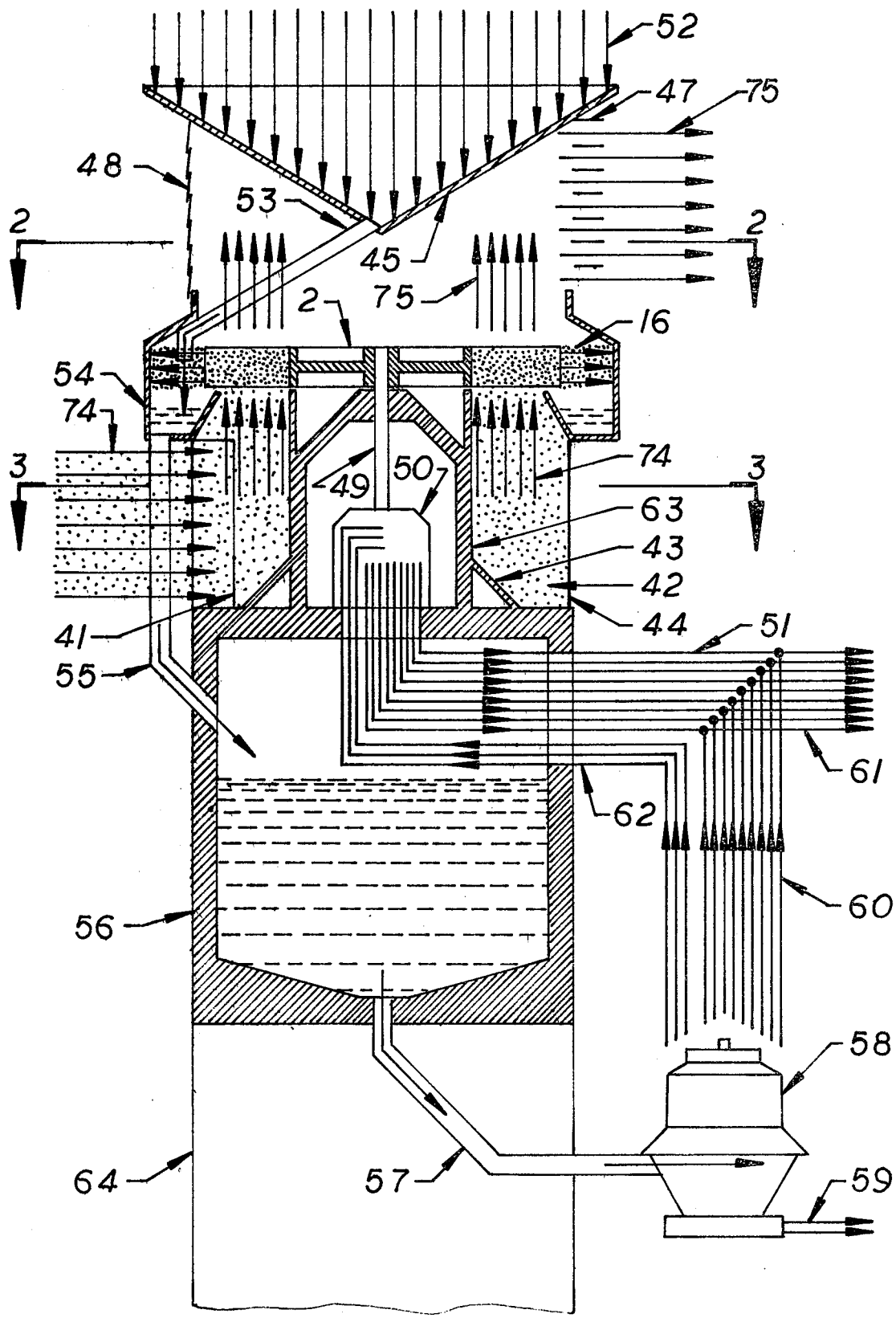
FIG. 1 is a schematic sectional drawing of a devaporizer-windmill system and apparatus according to a first possible embodiment of the present invention.
Figure 2:
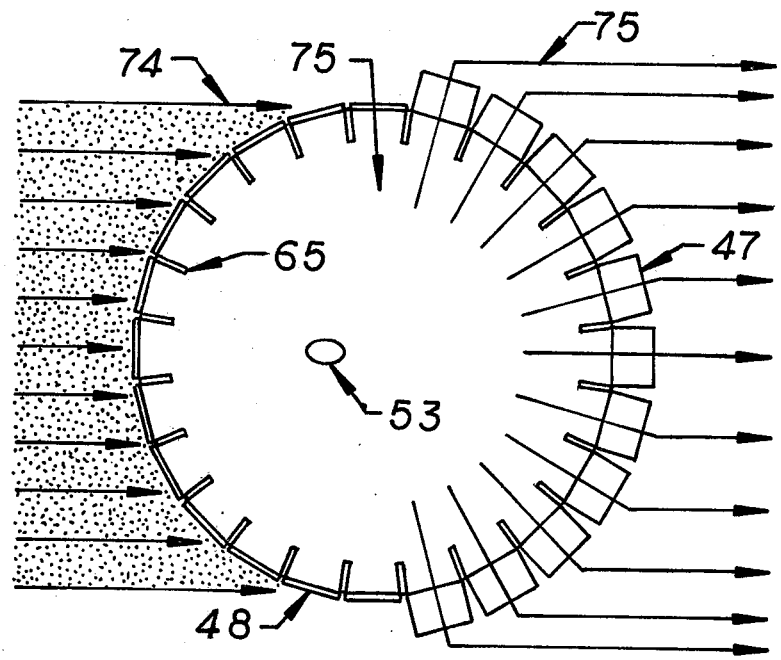
FIG. 2 is a sectional view of the FIG. 1 embodiment taken along line 2—2.
Figure 3:
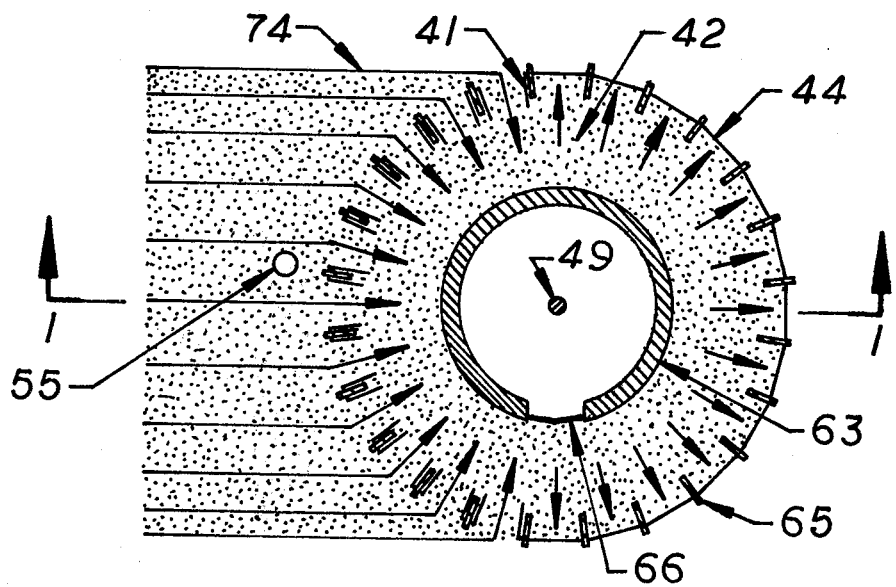
FIG. 3 is a sectional view of the FIG. 1 embodiment taken along line 3—3.

With reference to FIGS. 1, 2 and 3 of the drawings, there is shown a first embodiment of a devaporizer-windmill system and apparatus. In essence, first means, such as desiccant turbine or separator apparatus 2, functions as a vertical, wind-powered, electric generator which dehumidifies the through-going gasses, such as air 74, and collects the resulting absorbates 16, such as a liquid or moisture, for the purpose of powering a hydrodynamic electric generator, such as a hydroelectric generator 58.

The devaporizer-windmill is also provided with second means, such as an atmospherric air admission section, as shown in FIG. 3, for admitting gases, such as air 74, to enter therein and for directing the admitted gases or air 74 in a first predetermined direction toward and through the separator apparatus 2. The admission section may have a circular cross-section, and is provided with a plurality of doors 41 and 44 about its periphery.

Each door 41 and 44 is independently operable or movable by means of vertical, inwardly opening hinge. The pressure of the inblowing air 74 forces the windward doors 41 open, and retains the leeward doors 44 in their closed position.

The entrapped air 42 is thereby caused to flow upwardly by deflector 43, which is included in the second means, through blades or varrible-pitch air foils of the separator apparatus 2. The onrushing air 74 rotates the separator 2 and a motor-generator 50 which is operably and rotatably connected or is attached thereto by a driveshaft 49.

Third means, such as water duct 55, conducts the liquid 16 separated from air 74 to reservoir 56.

Fourth means, including the lower surface of conical roof deflector structure 45, the air exit section illustrated in FIG. 2, and a plurality of overlapping outwardly-opening louvered doors 47 and 48, direct the deliquified gases, such as the dehumidified air 75, out to the ambient atmosphere.

The air is dehumidified in the manner previously described, and is directed by the fourth means, which includes a surface of an air deflector 45, into the exit section shown in FIG. 2. The air exit section may have a circular cross-section, and may be provided with a plurality of overhung, overlapping louver doors. The windward exit doors 48 are kept closed by the pressure of the atmospheric air 74, while the leeward exit doors 47 are forced open by the pressure of the exiting dehumidified air 75.

The devaporizer-windmill is provided with a reservoir for liquid, such as a reservoir 56, which along with the devaporizer windmill is preferably positioned a substantial altitude above sea level so as to create sufficient head to operate the hydroelectric generator 58, which is connected thereto by a pipe 57.

The exterior surface of air deflector 45 forms fifth means, such as a cone-shaped collector for rain water 52, and is connected by rain spout 53 to soft water stream 54 which surrounds the separator apparatus 2 and collects the absorbates 16 discharged therefrom.

The soft water stream 54 is in turn connected to the soft water reservoir 56, by water duct 55. Spout 53, stream 54 and duct 55 form part of sixth means for conducting rain 52 to reservoir 56.

The reservoir 56 accumulates an ample reserve of soft water to power the generator 58 for several consecutive windless days. On such windless days, ample water is supplied from the reservoir 56 through the pipe 57 to permit the generator 58 to convert the water power to electric power.

Hydro-electric energy 60 is moderately generated during the windy days to supplement the aeolian-electric generated energy 51, and fully generated during the windless days to compensate for the aeolian-electric energy deficiency, and thereby maintains a constant, balanced and complementary aeolian-hydro-electric energy supply 61 throughout the year.

From the fully generated hydro-electric energy supply 60, the stand-by energy 62 is reserved to energize the motor-generator 50 during the windless days in view of devaporizing the atmospheric humidity and partially compensating for any voluminous consumption of soft water by the hydro-electric generator 58.

When energized by the stand-by hydro-electric energy supply 62, the electric motor-generator 50 drives the devaporizer-windmill 2 (the adsorber-desorber turbine) which propels the calm and humid atmospheric air and simultaneously deprives the same of its moisture constituent.

Whenever it is deemed necessary, during the windy days, the hydro-electric energy 60 may be fully generated to supplement the aeolian-electric power supply 51 during periods of peak consumption, provided that the volume of the water in reservoir 56 is sufficient to feed the hydro-electric energy generator 58 for several consecutive windless days.

When the apparatus 2 is erected in clusters and/or at different altitudes, or within the vicinity of an airport, the resultant outgoing dehumidified atmospheric air 75 diffuses rapidly into the humid atmosphere, and thereby reduces considerably and gradually the relative humidity of the ambient atmosphere. In such application, the present invention performs as a defogger.

Although only a few forms are of the present invention have been illustrated and described, it is obvious that various changes and modifications may be made without departing from the spirit of the present invention, and all such changes and modifications are contemplated and embraced as may come within scope of the following claims.

I claim:

1. A system comprising:
   a hydrodynamic electric generator;
   a reservoir for liquid operably communicating with said hydrodynamic electric generator for supplying liquid to said hydrodynamic electric generator for causing said hydrodynamic electric generator to thereby produce electric power;
   a motor-generator electrically connected to said hydrodynamic electric generator;
   first means for separating liquid from gases;
   said first means being operably and rotatably connected to said motor-generator;
   second means for admitting gases to enter therein and for directing the admitted gases in a first predetermined direction toward and through said first means;

said second means operably communicating with said first means so that normally said admitted gases directed in said first predetermined direction cause said first means to rotate at a suitable speed;

said hydrodynamic electric generator selectively feeding at least a portion of said produced electric power to said motor-generator to at least assist said directed admitted gases to rotate said first means when said directed admitted gases are incapable of rotating said first means at a suitable speed without assistance;

third means for conducting the liquid separated from the gases to said reservoir;

fourth means for directing the deliquified gases out to the ambient atmosphere;

fifth means for collecting liquid from the ambient atmosphere; and sixth means for conducting the liquid collected from the ambient atmosphere to said reservoir.

2. A system according to claim 1, wherein:

said first means includes a predetermined desiccant material which absorbs the liquid from said directed gases, and wherein the absorbed liquid is discharged radially from said first means, and said deliquified gases are expelled axially from said first means.

3. A system according to claim one, wherein:

said second means includes an admission section which has a circular cross-section and is provided with a plurality of doors about its periphery;

each of said doors being independently movable by means of an associated inwardly-opening hinge;

the entering in-blowing gases forcing some of said doors open and retaining other of said doors in their closed position; and said second means also including a deflector for directing said admitted gases to flow in said first predetermined direction toward and through said rotatable first means.

4. A system according to claim one, wherein:

said motor generator is disposed substantially centrally of said second means;

said motor generator being operably connected with said first means to generate electric power when said motor generator is driven by said rotatable first means; and said motor generator operates as an electric motor to at least partially drive said first means when said directed admitted gases are incapable of doing so without assistance.

5. A system according to claim one, wherein:

said rotatable first means includes variable-pitch air foils and governor means which regulates said variable-pitch air foils and adjusts the angle of incidence of said air foils relative to said first predetermined direction; and said governor means cancels all angles of incidence of said air foils relative to said first predetermined direction in the event of destructive high velocity of the said directed admitted gases.

6. A system according to claim one, wherein:

said fourth means includes an exhaust section which has a circular cross-section and is provided with a plurality of overlapping and outwardly-opening louvered doors about its periphery;

each of said louver being independently movable by means of associated outwardly-opening hinge;

the exiting out-blowing dehumidified air forcing some of said overhung, overlapping louver doors open at the leeward direction while other of said louver doors at the windward section stay closed by the said louvers' weight and the pressure of the atmospheric air.

7. A system according to claim one, wherein:

said fifth and sixth means include a conical structure a first surface of which serves as a collector for collecting liquid from the ambient atmosphere and an opposite surface of which serves to deflect the deliquified gases out to the ambient atmosphere.

* * * * *